US 011987200 B2

(12) United States Patent
Nagasawa (10) Patent No.: US 11,987,200 B2
(45) Date of Patent: May 21, 2024

(54) PEDESTRIAN PROTECTION AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/872,517

(22) Filed: Jul. 25, 2022

(65) Prior Publication Data

US 2023/0073588 A1  Mar. 9, 2023

(30) Foreign Application Priority Data

Sep. 9, 2021  (JP) ................................. 2021-146700

(51) Int. Cl.
  *B60R 21/36*  (2011.01)
  *B60R 21/216*  (2011.01)

(52) U.S. Cl.
  CPC ............ *B60R 21/36* (2013.01); *B60R 21/216* (2013.01)

(58) Field of Classification Search
  CPC ....... B60R 21/21; B60R 21/216; B60R 21/34; B60R 21/36
  See application file for complete search history.

(56) References Cited

U.S. PATENT DOCUMENTS

| 2006/0043712 | A1* | 3/2006 | Hakki | ................... B60R 21/36 |
| | | | | 280/735 |
| 2016/0355152 | A1* | 12/2016 | Perez Garcia | .......... B60R 21/34 |
| 2018/0162316 | A1* | 6/2018 | Saito | ....................... B60R 21/21 |
| 2019/0077361 | A1 | 3/2019 | Funahashi et al. | |
| 2020/0172041 | A1* | 6/2020 | Dix | ........................ B60R 21/235 |
| 2021/0229622 | A1* | 7/2021 | Baccouche | ............. B60R 19/42 |

FOREIGN PATENT DOCUMENTS

| DE | 102005008637 A1 | * | 8/2006 | ............. B60R 21/34 |
| DE | 102005012719 A1 | * | 9/2006 | ......... B60R 21/0134 |
| DE | 102012006534 A1 | * | 10/2013 | ............. B60R 21/36 |
| DE | 102013007425 A1 | * | 10/2014 | .......... B60R 19/205 |
| DE | 102012110945 B4 | * | 11/2023 | .......... B60R 19/205 |
| JP | 2017-177981 A | | 10/2017 | |
| KR | 20160080521 A | * | 7/2016 | ............. B60R 21/34 |
| KR | 20160114870 A | * | 10/2016 | ............. B60R 21/21 |
| WO | WO-2010000273 A1 | * | 1/2010 | ............. B60R 21/36 |

* cited by examiner

*Primary Examiner* — Barry Gooden, Jr.
(74) *Attorney, Agent, or Firm* — MCGINN I.P. LAW GROUP, PLLC (57) ABSTRACT

A pedestrian protection airbag apparatus includes an exterior front side airbag, and an exterior rear side airbag. The exterior front side airbag is disposed in a front portion of a side sill of a vehicle, and configured to, upon being supplied with gas, be expanded and deployed along a side surface of the vehicle. The exterior rear side airbag is disposed in a rear portion of the side sill of the vehicle, and configured to, upon being supplied with gas, be expanded and deployed along the side surface of the vehicle. An upper end portion of the exterior front side airbag is disposed lower than an upper end portion of the exterior rear side airbag.

20 Claims, 6 Drawing Sheets

PEDESTRIAN PROTECTION AIRBAG APPARATUS

CROSS-REFERENCE TO RELATED APPLICATIONS

The present application claims priority from Japanese Patent Application No. 2021-146700 filed on Sep. 9, 2021, the entire contents of which are hereby incorporated by reference.

BACKGROUND

The disclosure relates to a pedestrian protection airbag apparatus.

Japanese Unexamined Patent Application Publication No. 2017-177981 discloses a pedestrian protection apparatus including: a right airbag expanded and deployed between a right-side rear end of a hood of a vehicle and a windshield; and a left airbag expanded and deployed between a left-side rear end of the hood of the vehicle and the windshield. The pedestrian protection apparatus also includes a collision position detection device to detect a collision position with a pedestrian in a vehicle width direction. When the collision position detector detects a collision position with a pedestrian, a controller performs control in accordance with the collision position with the pedestrian so that one of the right airbag and the left airbag is expanded and deployed earlier than the other of the right airbag and the left airbag. This can improve protection performance for the pedestrian that falls down onto the hood.

SUMMARY

An aspect of the disclosure provides a pedestrian protection airbag apparatus including an exterior front side airbag, and an exterior rear side airbag. The exterior front side airbag is disposed in a front portion of a side sill of a vehicle, and configured to, upon being supplied with gas, be expanded and deployed along a side surface of the vehicle. The exterior rear side airbag is disposed in a rear portion of the side sill of the vehicle, and configured to, upon being supplied with gas, be expanded and deployed along the side surface of the vehicle. An upper end portion of the exterior front side airbag is disposed lower than an upper end portion of the exterior rear side airbag.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In a collision between a pedestrian and a front portion of a vehicle, for example, after the pedestrian that has collided with the vehicle falls down onto a hood of the vehicle, the pedestrian may fall along a side surface of the vehicle downward of the vehicle and collide against the ground. That is, in the collision between the pedestrian and the front portion of the vehicle, the pedestrian that has collided with the vehicle may be considered to undergo a secondary collision against the ground. Therefore, in view of improving pedestrian protection performance, the vehicle desirably has a configuration that can reduce the secondary collision of the pedestrian.

It is desirable to provide a pedestrian protection airbag apparatus that can reduce a secondary collision of a pedestrian.

Hereinafter, a pedestrian protection airbag apparatus 10 according to an embodiment of the disclosure will be described with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. As illustrated for convenience in the drawings, arrow FR indicates a vehicle front side of a vehicle (automobile) V to which the pedestrian protection airbag apparatus 10 is applied, arrow UP indicates a vehicle upper side, and arrow RH indicates a vehicle right side (one side of a vehicle width direction). In the following description, a vertical direction, a fore-and-aft direction, and a lateral direction are used to respectively indicate a vehicle vertical direction, a vehicle fore-and-aft direction, and a vehicle lateral direction unless otherwise specified.

The pedestrian protection airbag apparatus 10 is provided as a pedestrian protecting apparatus disposed on each side of the vehicle V in the vehicle width direction so as to protect a pedestrian P that falls down along an outer side surface of the vehicle V in the vehicle width direction. The pedestrian protection airbag apparatus 10 is also provided as a side collision airbag apparatus to relieve a side collision with a collision object in the event of the side collision between the vehicle V and the collision object. A description will now be given on an example of disposing the pedestrian protection airbag apparatus 10 on a right side portion of the vehicle V.

Figure 1:
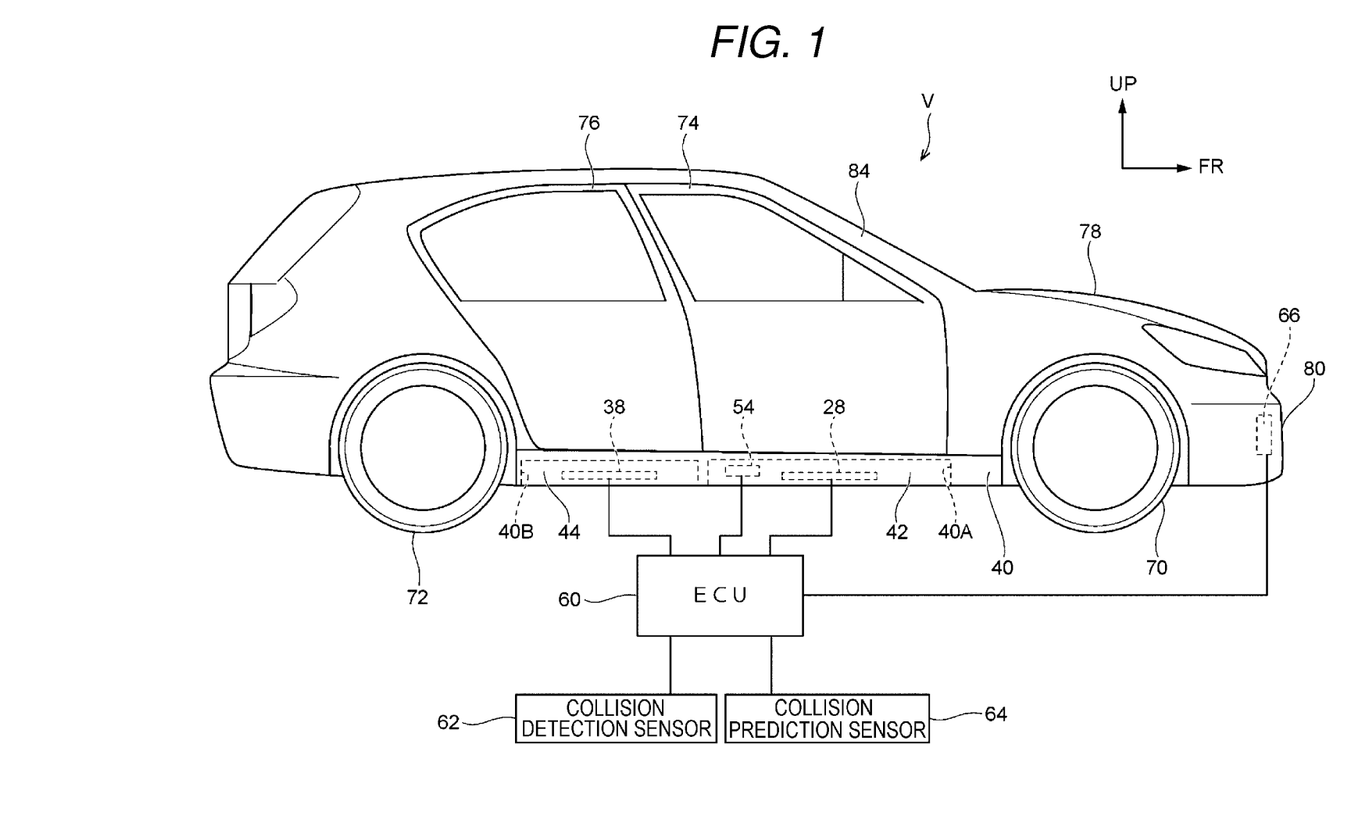
FIG. 1 is a side view of a vehicle where a pedestrian protection airbag apparatus according to an embodiment of the disclosure is applied, as viewed from the right.
Figure 2A:
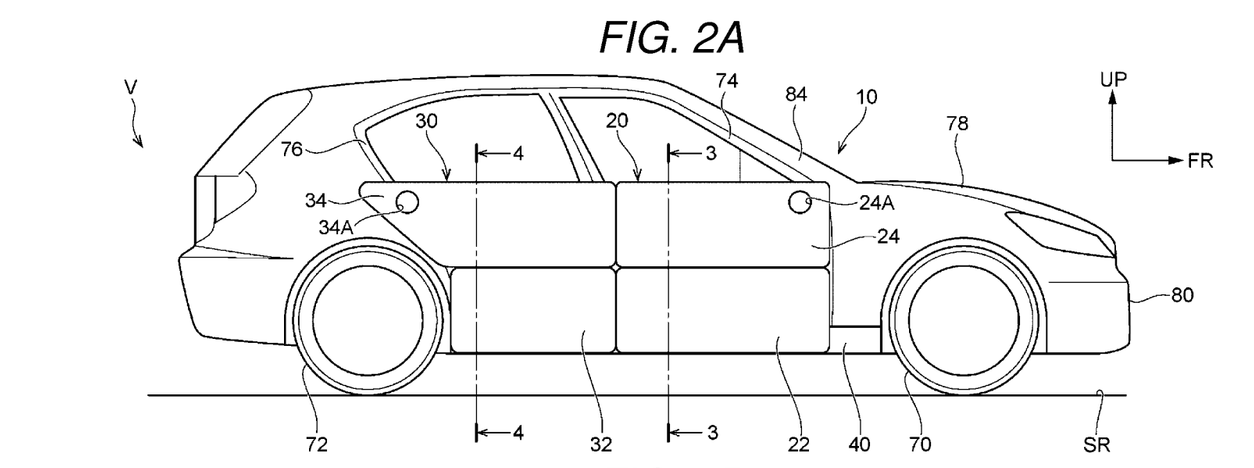
FIG. 2A is a right side view of an expanded and deployed state of a front side airbag and a rear side airbag of the pedestrian protection airbag apparatus during a side collision between the vehicle and a collision object.
Figure 2B:
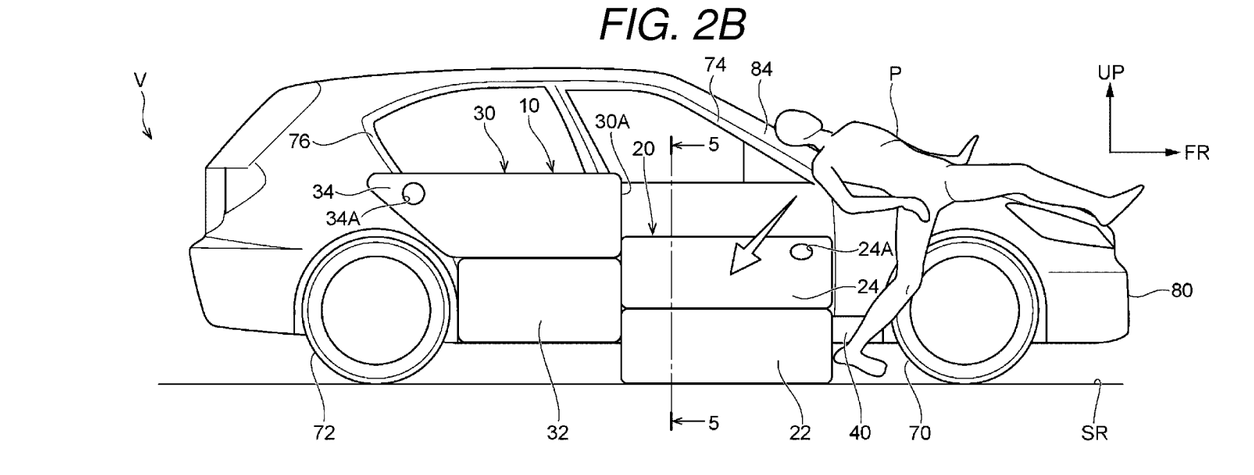
FIG. 2B is a right side view of an expanded and deployed state of the front side airbag and the rear side airbag of the pedestrian protection airbag apparatus during a collision between the vehicle and a pedestrian.

As illustrated in FIGS. 1 to 5, the pedestrian protection airbag apparatus 10 includes: an exterior front side airbag 20 (hereinafter simply referred to as "front side airbag 20"); an exterior rear side airbag 30 (hereinafter simply referred to as "rear side airbag 30"); a front inflator 28 disposed on the front side airbag 20 and configured to supply gas to the front side airbag 20; a rear inflator 38 disposed on the rear side airbag 30 and configured to supply gas to the rear side airbag 30; and an ECU (electronic control unit) 60 configured to operate the front inflator 28 and the rear inflator 38 (see FIG. 1). In one embodiment, the front side airbag 20 may serve as an "exterior front side airbag", the rear side airbag 30 may serve as an "exterior rear side airbag", and the ECU 60 may serve as a "controller".

The pedestrian protection airbag apparatus 10 is disposed inside a side sill 40 (also called "rocker") of the vehicle V. The side sill 40 constitutes a lower end of the right side portion of the vehicle V and has a substantially hollow cylindrical shape extending in the fore-and-aft direction. The side sill 40 is interposed between a front wheel 70 and a rear wheel 72 of the vehicle V. The front side airbag 20 in a folded state and the front inflator 28 are incorporated in a front portion of the side sill 40, and the rear side airbag 30 in a folded state and the rear inflator 38 are incorporated in a rear portion of the side sill 40. The front inflator 28 and the rear inflator 38 have substantially cylindrical shapes having axial directions in the fore-and-aft direction and are electrically connected to the ECU 60. When the ECU 60 operates the front inflator 28 (rear inflator 38), gas ejected by the front inflator 28 (rear inflator 38) is supplied to the front side airbag 20 (rear side airbag 30) so as to expand and deploy the front side airbag 20 (rear side airbag 30).

When expanded and deployed, the front side airbag 20 and the rear side airbag 30 respectively open a front bag door 42 and a rear bag door 44 formed in the side sill 40 so that the front side airbag 20 and the rear side airbag 30 are expanded and deployed to the right side portion of the vehicle V. Hereinafter, configurations of the front bag door 42 and the rear bag door 44 will be described first, and then, the front side airbag 20, the rear side airbag 30, and the ECU 60 will be described.

Front Bag Door 42 and Rear Bag Door 44

A tear part 40A (see FIG. 1) is formed in a front portion of an outside wall of the side sill 40 in the vehicle width direction. The tear part 40A is configured to be ruptured open by an expansion pressure of the front side airbag 20. An inner portion of the tear part 40A in the side sill 40 constitutes the front bag door 42. A tear part 40B (see FIG. 1) is formed in a rear portion of the outside wall of the side sill 40 in the vehicle width direction. The tear part 40B is configured to be ruptured open by an expansion pressure of the rear side airbag 30. An inner portion of the tear part 40B in the side sill 40 constitutes the rear bag door 44. When the pedestrian protection airbag apparatus 10 is operated, the front bag door 42 and the rear bag door 44 are opened and inclined outward in the vehicle width direction so as to open the side sill 40. In one example, the front bag door 42 includes a hinge 42A coupled to the side sill 40. The front bag door 42 is opened to extend outward in the vehicle width direction from the hinge 42A (to a position illustrated in FIG. 3. This position of the front bag door 42 will be hereinafter referred to as "opened position"). Similarly, the rear bag door 44 includes a hinge 44A coupled to the side sill 40. The rear bag door 44 is opened to extend outward in the vehicle width direction from the hinge 44A (to a position illustrated in FIG. 4. This position of the rear bag door 44 will be hereinafter referred to as "opened position").

Figure 3:
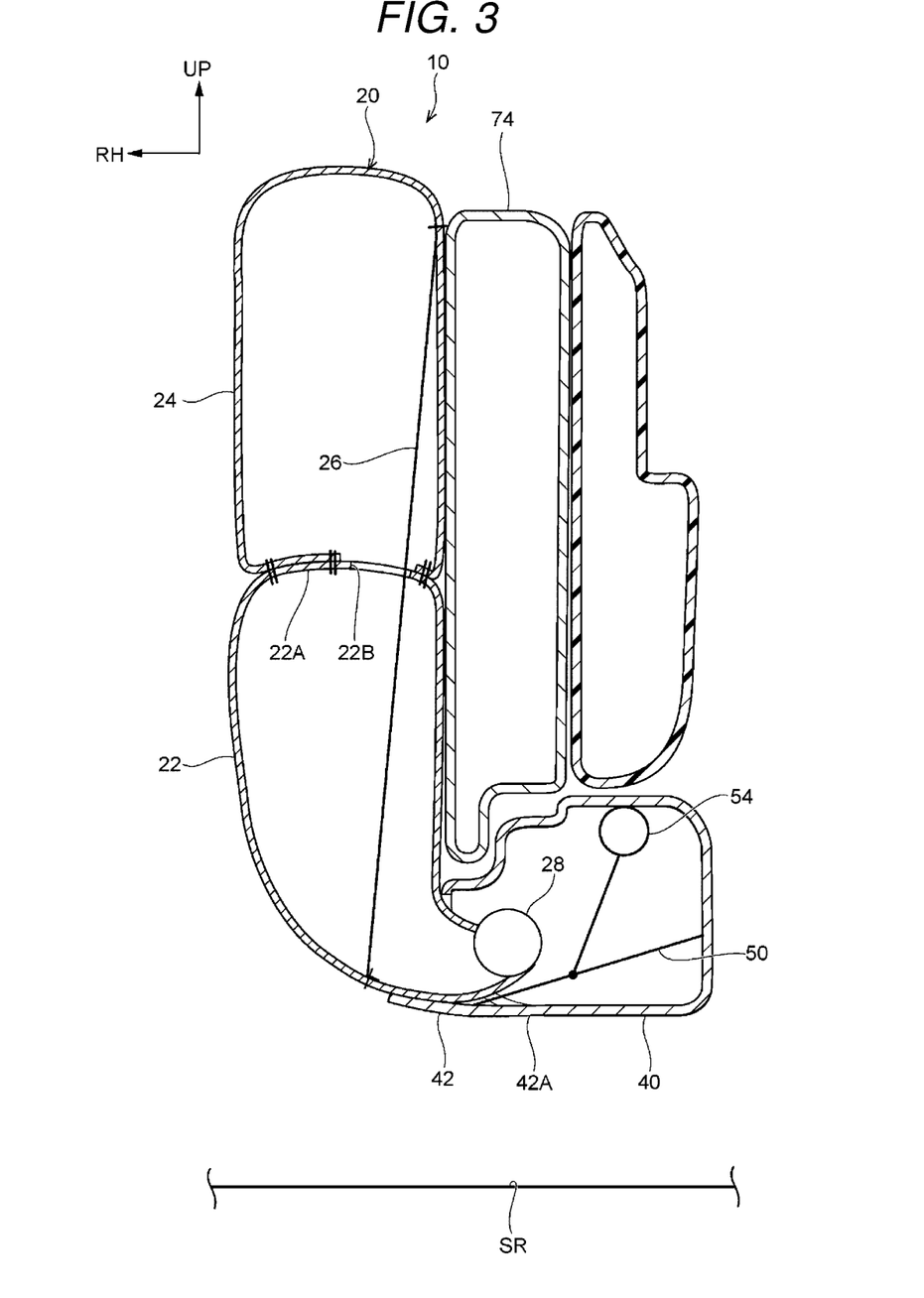
FIG. 3 is a cross-sectional view of the expanded and deployed state of the front side airbag illustrated in FIG. 2A, as viewed from the front (a cross-sectional view taken along line 3-3 of FIG. 2A).
Figure 4:
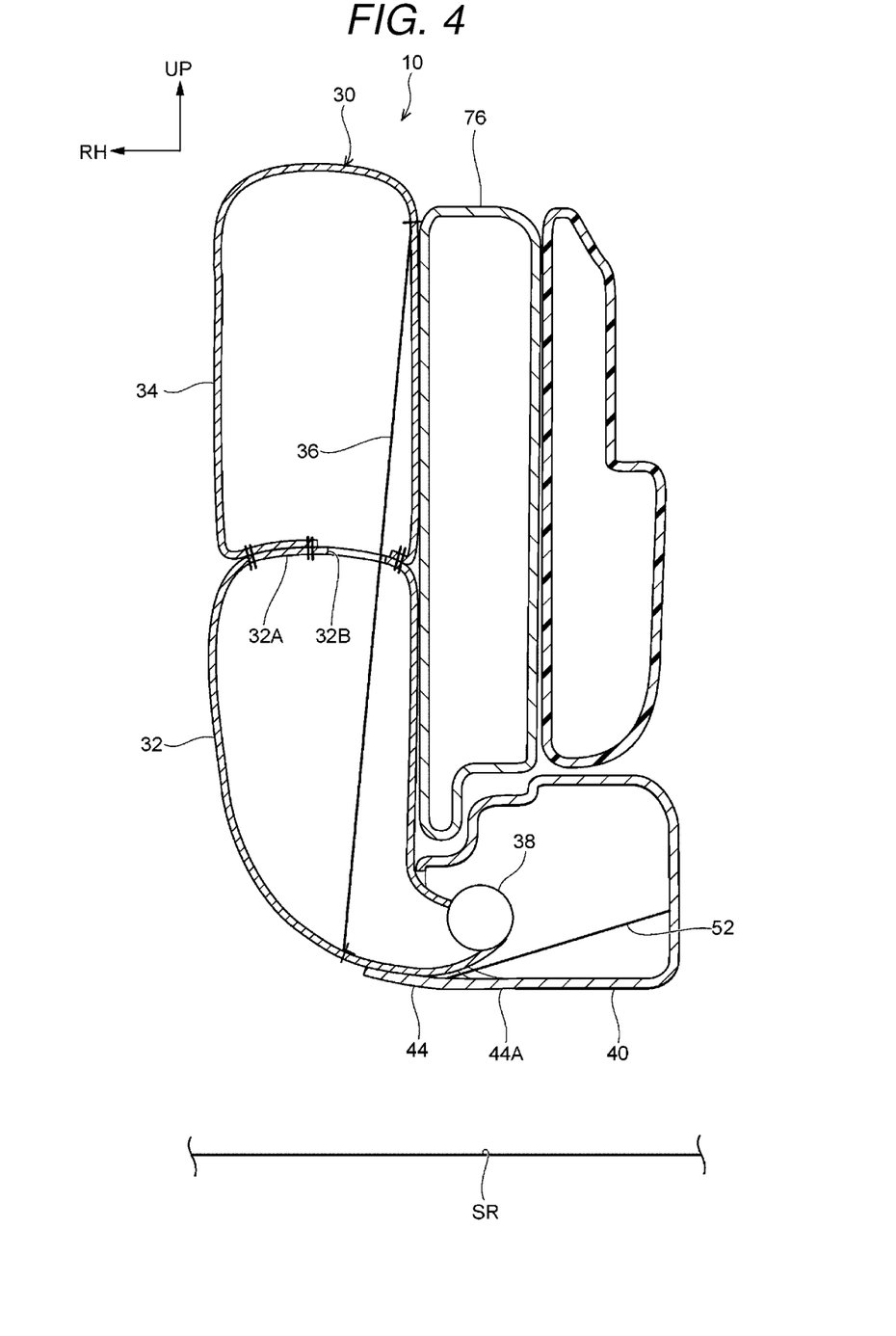
FIG. 4 is a cross-sectional view of the expanded and deployed state of the rear side airbag illustrated in FIG. 2A, as viewed from the front (a cross-sectional view taken along line 4-4 of FIG. 2A).

The front bag door 42 is coupled to a front bag door holder 50 disposed inside the side sill 40 (see FIG. 3). In one embodiment, the front bag door holder 50 may serve as a "front holder". The front bag door holder 50 is made of a string member. The front bag door 42 is held in the opened position by the front bag door holder 50. In a similar manner to the front bag door 42, the rear bag door 44 is coupled to a rear bag door holder 52 disposed inside the side sill 40 and made of a string member (see FIG. 4). The rear bag door 44 is held in the opened position by the rear bag door holder 52. In one embodiment, the rear bag door holder 52 may serve as a "rear holder".

Figure 5:
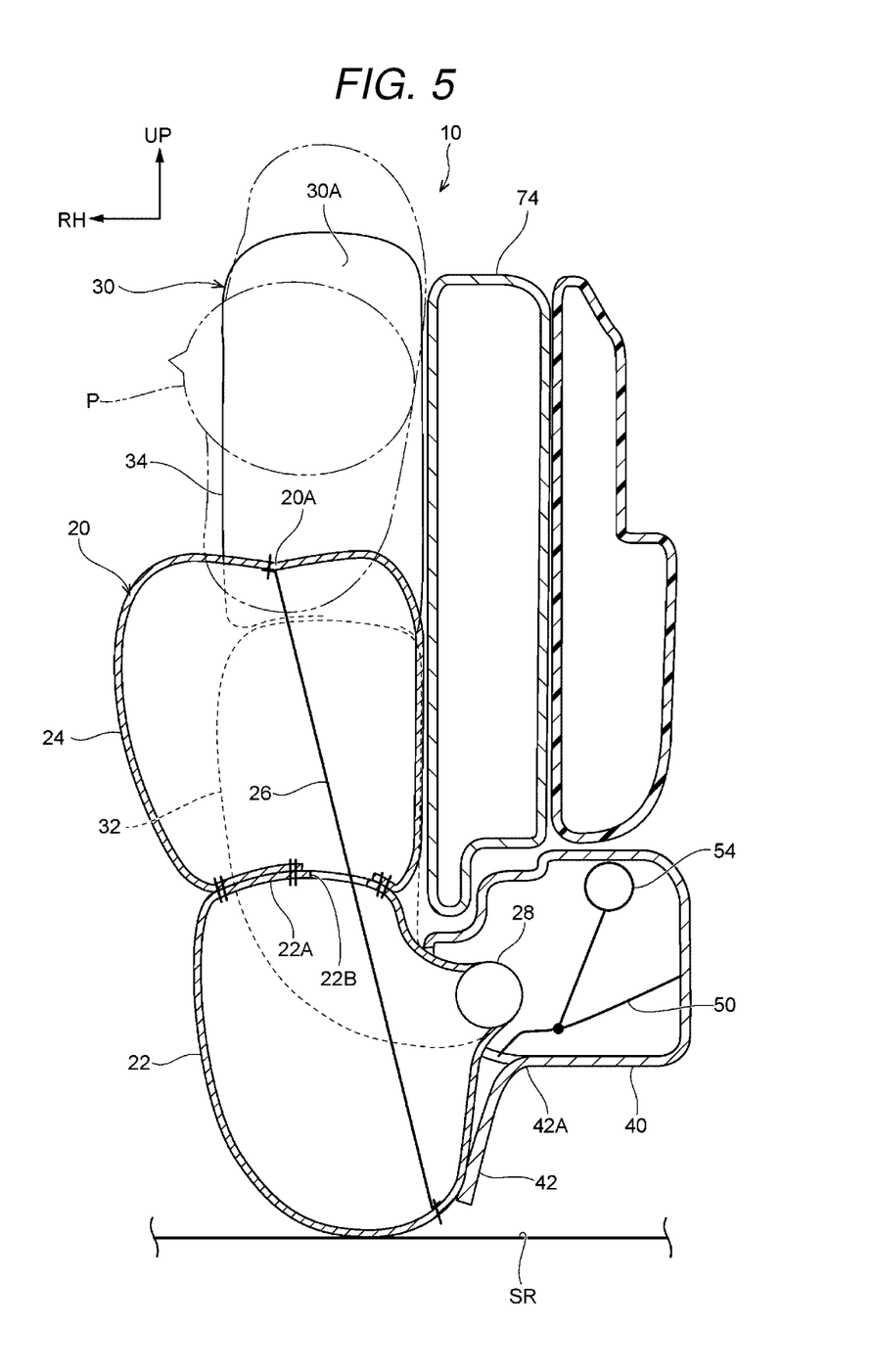
FIG. 5 is a cross-sectional view of the expanded and deployed state of the front side airbag illustrated in FIG. 2B, as viewed from the front (a cross-sectional view taken along line 5-5 of FIG. 2B).

An actuator 54 configured to release a hold state of the front bag door 42 by the front bag door holder 50 is disposed inside the side sill 40 (see FIG. 3). In one embodiment, the actuator 54 may serve as a "hold releaser". The actuator 54 is coupled to the front bag door holder 50. The actuator 54 includes, for example: a cylinder; a piston accommodated in the cylinder and coupled to the front bag door holder 50; and a gas generator disposed inside the cylinder. The actuator 54 is electrically connected to the ECU 60, described later. Upon a collision between the vehicle V and the pedestrian P, the ECU 60 operates the actuator 54 in such a manner that the front bag door holder 50 is cut by the actuator 54. In one example, gas generated by the gas generator is filled in the cylinder, and a gas pressure in the cylinder causes the piston to move relative to the cylinder so as to cut the front bag door holder 50. Thus, as illustrated in FIG. 5, the hold state of the front bag door 42 by the front bag door holder 50 can be released to increase an opening amount of the front bag door 42. When the hold state of the front bag door 42 by the front bag door holder 50 is released, the front bag door 42 is turned about the hinge 42A and further opened from the opened position until the front bag door 42 occupies a further opened position (see the position illustrated in FIG. 5) lower than the opened position.

Front Side Airbag 20

As illustrated in FIGS. 2A, 2B, 3, and 5, the front side airbag 20 in one example is formed in a bag shape by sewing outer peripheral portions of a plurality of base cloths. In one example, in an expanded and deployed state of the front side airbag 20, the front side airbag 20 has a thickness direction in the lateral direction and is formed in a substantially rectangular bag shape as viewed from the right. The front side airbag 20 includes: a lower bag 22 that constitutes a lower portion of the front side airbag 20; and an upper bag 24 that constitutes an upper portion of the front side airbag 20. The upper bag 24 has a substantially inverted U shape opened downward in a cross-sectional view as viewed from the fore-and-aft direction. A lower opening portion of the upper bag 24 folded inward in the thickness direction is coupled to an upper end portion of the lower bag 22 by sewing, for example. A part of the upper end portion of the lower bag 22 that is sewn to the upper bag 24 constitutes a partition wall 22A. A plurality of communication holes 22B (see FIGS. 3 and 5) are formed through the partition wall 22A and arranged in a line in the fore-and-aft direction. Thus, the lower bag 22 and the upper bag 24 communicate with each other via the communication holes 22B. A vent hole 24A (see FIGS. 2A and 2B) is formed in the upper bag 24 in such a manner that an inner pressure of the upper bag 24 is lower than an inner pressure of the lower bag 22.

When supplied with gas from the front inflator 28, the front side airbag 20 is expanded and deployed outward in the vehicle width direction and upward from the front portion of the side sill 40 and positioned along an outer surface of a lower portion of a front side door 74 of the vehicle V. In one example, when the front bag door 42 is in the opened position, a lower end portion of the lower bag 22 is positioned outside the side sill 40 in the vehicle width direction and supported by the front bag door 42 from below (see FIG. 3). When the front bag door 42 is in the further opened position, the lower end portion of the lower bag 22 is positioned at a diagonally right, lower side of the side sill 40 and in contact with a road surface SR so as to be supported by the road surface SR from below (see FIG. 5). That is, when the front bag door 42 is in the further opened position, the front side airbag 20 is positioned further below than when the front bag door 42 is in the opened position. That is, when the front bag door 42 is in the further opened position, an upper end of the front side airbag 20 is positioned at a lower level than a hood 78 of the vehicle V so as to sustain, from below, the head and the upper half body of the pedestrian P falling down onto a right side portion of the vehicle V (see FIG. 2B).

Moreover, a plurality of tethers 26 configured to couple a lower end portion and an upper end portion of the front side airbag 20 to each other are disposed inside the front side airbag 20. The tethers 26 have substantially elongated string shapes. A first end (lower end) of each of the tethers 26 is coupled to a position in the lower bag 22 that substantially corresponds to a distal end of the front bag door 42 whereas a second end (upper end) of the tether 26 is coupled to an upper end portion of the upper bag 24. When the front bag door 42 is in the further opened position, a position of the upper end portion of the front side airbag 20 in the vertical direction is restricted by the tethers 26 so that a recess 20A opened upward is formed in the upper end portion of the front side airbag 20 (see FIG. 5). When the front bag door 42 is in the opened position, the second end (upper end) of each of the tethers 26 is positioned adjacently outside the front side door 74 of the vehicle V in the vehicle width direction. Thus, the tethers 26 pull the front side airbag 20 toward the front side door 74 so as to favorably maintain a position and a posture of the front side airbag 20. It is noted that the tethers 26 are inserted through the communication holes 22B in the front side airbag 20 so as to couple the lower end portion and the upper end portion of the front side airbag 20 to each other.

Rear Side Airbag 30

As illustrated in FIGS. 2A, 2B, 4, and 5, the rear side airbag 30 has a similar configuration to the front side airbag 20. That is, in an expanded and deployed state of the rear side airbag 30, the rear side airbag 30 has a thickness direction in the lateral direction and is formed in a substantially rectangular bag shape as viewed from the right. The rear side airbag 30 includes: a lower bag 32 that constitutes a lower portion of the rear side airbag 30; and an upper bag 34 that constitutes an upper portion of the rear side airbag 30. A lower end portion of the upper bag 34 is coupled to an upper end portion of the lower bag 32 by sewing, for example. It is noted that a rear end portion of the upper bag 34 of the rear side airbag 30 protrudes more rearward than the lower bag 32 along a wheelhouse of the vehicle V. A plurality of communication holes 32B (see FIG. 4) are formed through a partition wall 32A at the upper end portion of the lower bag 32. Moreover, a vent hole 34A (see FIGS. 2A and 2B) is formed in the upper bag 34 in such a manner that an inner pressure of the upper bag 34 is lower than an inner pressure of the lower bag 32.

A plurality of tethers 36 (see FIG. 4) configured to couple a lower end portion and an upper end portion of the rear side airbag 30 to each other are disposed inside the rear side airbag 30. The tethers 36 are inserted through the communication holes 32B in the rear side airbag 30.

When the rear inflator 38 is operated, the rear side airbag 30 is expanded and deployed outward in the vehicle width direction and upward from the rear portion of the side sill 40 so as to be positioned along an outer surface of a rear side door 76 of the vehicle V and positioned adjacently behind the front side airbag 20. A lower end portion of the lower bag 32 of the rear side airbag 30 is positioned outside the side sill 40 in the vehicle width direction and supported by the rear bag door 44 in the opened position from below. When the front bag door 42 is in the further opened position, the upper end portion of the rear side airbag 30 is positioned at a higher level than the upper end portion of the front side airbag 20 in such a manner that a stepped portion 30A is formed between the front side airbag 20 and the rear side airbag 30 (see FIGS. 2B and 5). Thus, the stepped portion 30A sustains the pedestrian P that falls down onto the front side airbag 20 and prevents the pedestrian P from moving rearward. It is noted that in a similar manner to the front side airbag 20, the tethers 36 of the rear side airbag 30 are positioned adjacently outside the rear side door 76 of the vehicle V in the vehicle width direction, and that the tethers 36 pull the rear side airbag 30 toward the rear side door 76 so as to favorably maintain a position and a posture of the rear side airbag 30.

ECU 60

As illustrated in FIG. 1, the front inflator 28, the rear inflator 38, and the actuator 54 described above are electrically connected to the ECU 60. Under control by the ECU 60, the front inflator 28, the rear inflator 38, and the actuator 54 are operated.

Moreover, a collision detection sensor 62, a collision prediction sensor 64, and a pedestrian collision detection sensor 66 are disposed on the vehicle V and electrically connected to the ECU 60. In one embodiment, the collision detection sensor 62 and the collision prediction sensor 64 may serve as a "collision detector", and the pedestrian collision detection sensor 66 may serve as a "pedestrian collision detector".

The collision detection sensor 62 includes an acceleration sensor, for example, and is disposed on an outer peripheral portion of the vehicle V. The collision detection sensor 62 measures an acceleration, for example, input to the vehicle V, and outputs measured data to the ECU 60. The collision prediction sensor 64 includes a stereo camera, for example. The collision prediction sensor 64 captures an image of surroundings of the vehicle V and detects a collision object with the vehicle V. Also, the collision prediction sensor 64 measures, for example, a distance to the collision object detected and a relative speed of the vehicle V and the collision object, and outputs measured data to the ECU 60. Then, based on output signals from the collision detection sensor 62 and the collision prediction sensor 64, the ECU 60 detects a collision, such as a frontal collision and a side collision, with the vehicle V.

The pedestrian collision detection sensor 66 is disposed on a front side of a bumper beam (not illustrated) of a front bumper 80 disposed on a front end portion of the vehicle V. This pedestrian collision detection sensor 66 includes: a pressure tube of a substantially elongated shape having a longitudinal direction in the vehicle width direction; and pressure sensors disposed on both sides of the pressure tube in the longitudinal direction. A signal in accordance with a pressure change in the pressure tube is output from the pedestrian collision detection sensor 66 to the ECU 60 so that the ECU 60 determines whether the collision object that has collided with the front of the vehicle V is a pedestrian or an obstacle other than a pedestrian.

When the ECU 60 detects a side collision between the vehicle V and the collision object based on output signals from the collision detection sensor 62 and the collision prediction sensor 64, the ECU 60 operates the front inflator 28 and the rear inflator 38. When the ECU 60 detects a collision between the front of the vehicle V and a pedestrian based on output signals from the collision detection sensor 62, the collision prediction sensor 64, and the pedestrian collision detection sensor 66, the ECU 60 operates the front inflator 28, the rear inflator 38, and the actuator 54. That is, upon the side collision of the vehicle V, the actuator 54 is not operated but the front bag door 42 is opened to the opened position, and upon the collision between the vehicle V and the pedestrian P, the actuator 54 is operated in such a manner that an expansion pressure of the front side airbag 20 opens the front bag door 42 to the further opened position.

Functions and Effects

Next, a description will be given on a behavior of the pedestrian P and an operation of the pedestrian protection airbag apparatus 10 when the pedestrian P collides with the vicinity of a right corner of the front of the vehicle V. At the same time, functions and effects of this embodiment will be described.

Figure 6:
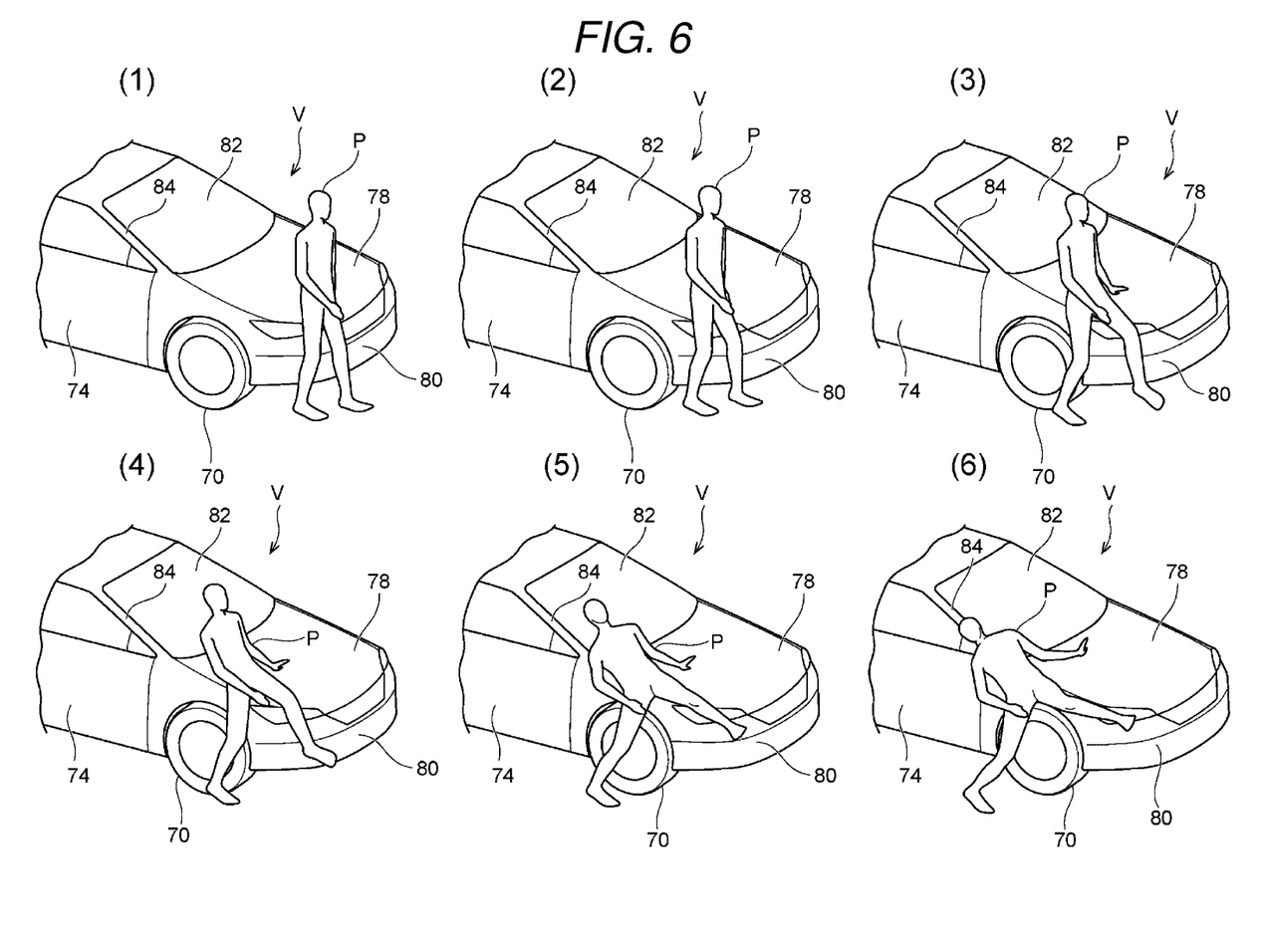
FIG. 6 is a diagram illustrating a behavior of the pedestrian during the collision between the vehicle and the pedestrian.

FIG. 6 illustrates, on a time-series basis, the behavior of the pedestrian P when the pedestrian P collides with the vicinity of the right corner of the front of the vehicle V. As illustrated in (1) to (3) of FIG. 6, at an early stage of the collision between the vehicle V and the pedestrian P, the front bumper 80 at the front end portion of the vehicle V strikes a leg of the pedestrian P upward so that the pedestrian P falls onto a right side portion (right end portion) of the hood 78 of the vehicle V. Then, as illustrated in (4) to (6) of FIG. 6, at a later stage of the collision between the vehicle V and the pedestrian P, the pedestrian P that has fallen onto the right side portion (right end portion) of the hood 78 of the vehicle V falls from a rear end side portion of the hood 78 of the vehicle V toward an outer side of the front side door 74 of the vehicle V in the vehicle width direction. Thus, the pedestrian P slides down along an outer surface of the front side door 74 of the vehicle V (see arrow in FIG. 2B) so that the pedestrian P may collide against the road surface SR. It is noted that although not illustrated, during the collision between the pedestrian P and the vehicle V, a rear end portion of the hood 78 is raised up, and that a hood airbag for pedestrian protection is expanded and deployed from between the hood 78 and a windshield glass 82 toward a front pillar 84 in such a manner that the hood airbag protects the pedestrian P falling onto the hood 78.

Upon the collision between the vehicle V and the pedestrian P, the ECU 60 operates the front inflator 28 and the rear inflator 38 of the pedestrian protection airbag apparatus 10 based on output signals from the collision detection sensor 62, the collision prediction sensor 64, and the pedestrian collision detection sensor 66. As a result, the front inflator 28 supplies gas to the front side airbag 20, and the front side airbag 20 is expanded and deployed outward in the vehicle width direction and upward from the side sill 40 and positioned along the outer surface of the front side door 74. Meanwhile, the rear inflator 38 supplies gas to the rear side airbag 30, and the rear side airbag 30 is expanded and deployed outward in the vehicle width direction and upward from the side sill 40 and positioned along the outer surface of the rear side door 76. Furthermore, at this time, the ECU 60 operates the actuator 54. Thus, the front bag door holder 50 is cut to open the front bag door 42 to the further opened position. As a result, the upper end portion of the front side airbag 20 is positioned at a lower level than the upper end portion of the rear side airbag 30 in such a manner that the stepped portion 30A is formed between the front side airbag 20 and the rear side airbag 30.

Consequently, when the pedestrian P falls from the rear end side portion of the hood 78 of the vehicle V toward an outer side of the front side door 74 in the vehicle width direction, the front side airbag 20 sustains the upper half body of the pedestrian P from below, and also, the stepped portion 30A between the front side airbag 20 and the rear side airbag 30 sustains the head of the pedestrian P (see FIG. 5). At this time, the lower bag 22 of the front side airbag 20 comes into contact with the road surface SR, and the front side airbag 20 is supported by the road surface SR from below. As a result, an upward reaction force is applied from the road surface SR to the front side airbag 20 so that the pedestrian P can be favorably sustained by the front side airbag 20. Therefore, with the pedestrian protection airbag apparatus 10 according to this embodiment, the pedestrian P that has fallen from the rear end side portion of the hood 78 toward the outer side of the front side door 74 of the vehicle V in the vehicle width direction can be prevented from colliding against the road surface SR. That is, a secondary collision of the pedestrian P can be reduced.

The front bag door 42 and the rear bag door 44 are formed in the side sill 40. When the rear side airbag 30 is expanded and deployed, the rear bag door 44 is opened to the opened position so that the rear side airbag 30 is supported from below by the rear bag door 44 in the opened position. Similarly, when the front side airbag 20 is expanded and deployed, the front bag door 42 is opened outward in the vehicle width direction. During the collision with the pedestrian P, the front bag door 42 is positioned at a lower level than the rear bag door 44, and the lower end portion of the front side airbag 20 is positioned at a lower level than the lower end portion of the rear side airbag 30. Thus, by setting an opening amount of the front bag door 42 larger than an opening amount of the rear bag door 44, the whole front side airbag 20 is displaced to a lower level than the rear side airbag 30 in such a manner that the stepped portion 30A can be formed between the front side airbag 20 and the rear side airbag 30.

The front bag door holder 50 coupled to the front bag door 42 is disposed inside the side sill 40, and the front bag door 42 is held in the opened position by the front bag door holder 50. The rear bag door holder 52 coupled to the rear bag door 44 is disposed inside the side sill 40, and the rear bag door 44 is held in the opened position by the rear bag door holder 52. Moreover, the actuator 54 configured to release the hold state of the front bag door 42 by the front bag door holder 50 is coupled to the front bag door holder 50. When the actuator 54 is operated, the front bag door holder 50 is cut to release the hold state of the front bag door 42 by the front bag door holder 50. Thus, upon the collision with the pedestrian P, the actuator 54 is operated to displace the front side airbag 20 to a lower level than the rear side airbag 30 in such a manner that the stepped portion 30A can be formed between the front side airbag 20 and the rear side airbag 30.

When the ECU 60 detects the collision between the pedestrian P and the vehicle V, the ECU 60 operates the actuator 54 so as to release the hold state of the front bag door 42 by the front bag door holder 50. When the ECU 60 detects the side collision between the collision object and the vehicle V, the ECU 60 maintains the actuator 54 in a non-operating state. Thus, the pedestrian protection airbag apparatus 10 can be used both as an airbag apparatus for pedestrian protection and as an airbag apparatus for a side collision. That is, as described above, during the collision between the pedestrian P and the vehicle V, the front side airbag 20 is displaced downward so that the front side airbag 20 can sustain the pedestrian P from below, and that the stepped portion 30A between the front side airbag 20 and the rear side airbag 30 can sustain the pedestrian P from behind. During the side collision of the vehicle V, an area where the front side airbag 20 covers the front side door 74 can be enlarged to relieve the collision with the collision object.

Moreover, the tethers 26 configured to couple the lower end portion and the upper end portion of the front side airbag 20 are disposed inside the front side airbag 20. When the actuator 54 is operated, the recess 20A opened upward of the vehicle V is formed in the upper end portion of the front side airbag 20 by the tethers 26. That is, during the collision between the vehicle V and the pedestrian P, the recess 20A is formed in the upper end portion of the front side airbag 20. Thus, the recess 20A can sustain the pedestrian P while softly holding a shoulder and the head of the pedestrian P that falls onto the front side airbag 20 from above. Furthermore, by forming the recess 20A, the upper bag 24 of the front side airbag 20 can be increased in thickness in the lateral direction. Therefore, the pedestrian P that falls downward outside the vehicle V in the vehicle width direction can be favorably sustained by the upper bag 24 of the front side airbag 20.

Furthermore, when the actuator 54 is in the non-operating state, upper ends of the tethers 26 are positioned adjacently outside the side portion (front side door 74) of the vehicle V in the vehicle width direction. Thus, the front side airbag 20 can be pulled toward the front side door 74 by the tethers 26. Therefore, during the side collision between the collision object and the vehicle V, the front side airbag 20 can be favorably positioned along the outer surface of the front side door 74.

The front side airbag 20 includes: the upper bag 24 that constitutes the upper portion of the front side airbag 20; and the lower bag 22 that constitutes the lower portion of the front side airbag 20. The inner pressure of the upper bag 24 is lower than the inner pressure of the lower bag 22. Thus, while sustaining performance by the front side airbag 20 is secured by the lower bag 22, collision energy with respect to the pedestrian P that falls onto the front side airbag 20 from above can be effectively absorbed by the upper bag 24.

It is noted that in the pedestrian protection airbag apparatus 10 according to this embodiment, when the hold state of the front bag door 42 by the front bag door holder 50 is released, the upper end portion of the front side airbag 20 is displaced to a lower level than the upper end portion of the rear side airbag 30 so as to form the stepped portion 30A. Instead of this, the front bag door 42 may be held in the opened position by the front bag door holder 50, and a position of the upper end portion of the front side airbag 20 may be set below the position in this embodiment in advance, thereby forming the stepped portion 30A between the front side airbag 20 and the rear side airbag 30.

In the pedestrian protection airbag apparatus 10, the communication holes 22B (communication holes 32B) are formed in the lower bag 22 (lower bag 32) of the front side airbag 20 (rear side airbag 30) so as to allow the lower bag 22 (lower bag 32) and the upper bag 24 (upper bag 34) to communicate with each other. However, this configuration to allow the lower bag 22 (lower bag 32) and the upper bag 24 (upper bag 34) to communicate with each other does not exclude others. For example, the upper end portion of the lower bag 22 (lower bag 32) may be opened, and the upper end portion of the lower bag 22 (lower bag 32) and the lower end portion of the upper bag 24 (upper bag 34) may be coupled to each other by a plurality of tethers.

In the pedestrian protection airbag apparatus 10, the front inflator 28 supplies gas to the front side airbag 20, and the rear inflator 38 supplies gas to the rear side airbag 30. That is, the pedestrian protection airbag apparatus 10 includes the two inflators. Instead of this, the pedestrian protection airbag apparatus 10 may include a single inflator configured to supply gas to the front side airbag 20 and the rear side airbag 30.

The invention claimed is:

1. A pedestrian protection airbag apparatus comprising:
   an exterior front side airbag disposed in a front portion of a side sill of a vehicle, and configured to, upon being supplied with gas, be expanded and deployed along a side surface of the vehicle; and
   an exterior rear side airbag disposed in a rear portion of the side sill of the vehicle, and configured to, upon being supplied with gas, be expanded and deployed along the side surface of the vehicle,
   wherein an upper end portion of the exterior front side airbag is disposed lower than an upper end portion of the exterior rear side airbag when expanded and deployed, and
   wherein the exterior front side airbag is supported from below at a level lower than a level of a support from below the exterior rear side airbag.

2. The pedestrian protection airbag apparatus according to claim 1, wherein
   a front bag door and a rear bag door are disposed in the side sill,
   the front bag door is configured to be ruptured and opened outward in a vehicle width direction from a lower end portion of the side sill in a case where the exterior front side airbag is expanded and deployed; and
   the rear bag door is configured to be ruptured and opened outward in the vehicle width direction from a lower end portion of the side sill in a case where the exterior rear side airbag is expanded and deployed,
   the exterior rear side airbag is supported by the rear bag door from a lower side of the vehicle, and
   the front bag door is disposed lower than the rear bag door, and the exterior front side airbag is disposed lower than the exterior rear side airbag.

3. The pedestrian protection airbag apparatus according to claim 2,
   wherein the exterior front side airbag comprises
      an upper bag constituting an upper portion of the exterior front side airbag, and
      a lower bag constituting a lower portion of the exterior front side airbag, and
   wherein an inner pressure of the upper bag is lower than an inner pressure of the lower bag.

4. The pedestrian protection airbag apparatus according to claim 2, further comprising:
   a front holder coupled to the front bag door and configured to hold the front bag door;
   a rear holder coupled to the rear bag door and configured to hold the rear bag door; and
   a hold releaser coupled to the front holder and configured to, upon being operated, release the front bag door from being held by the front holder so as to position the front bag door lower than the rear bag door.

5. The pedestrian protection airbag apparatus according to claim 4,
wherein the exterior front side airbag comprises
an upper bag constituting an upper portion of the exterior front side airbag, and
a lower bag constituting a lower portion of the exterior front side airbag, and
wherein an inner pressure of the upper bag is lower than an inner pressure of the lower bag.

6. The pedestrian protection airbag apparatus according to claim 4, further comprising:
a pedestrian collision detector configured to detect a collision of a pedestrian with the vehicle;
a collision detector configured to detect a side collision of a collision object with the vehicle; and
a controller configured to control operation of the hold releaser, the controller being configured to detect the collision of the pedestrian with the vehicle based on an output signal from the pedestrian collision detector, and configured to detect the side collision with the vehicle based on an output signal from the collision detector, and
wherein upon detecting the collision of the pedestrian with the vehicle, the controller is configured to operate the hold releaser.

7. The pedestrian protection airbag apparatus according to claim 6,
wherein the exterior front side airbag comprises
an upper bag constituting an upper portion of the exterior front side airbag, and
a lower bag constituting a lower portion of the exterior front side airbag, and
wherein an inner pressure of the upper bag is lower than an inner pressure of the lower bag.

8. The pedestrian protection airbag apparatus according to claim 6,
wherein a tether is disposed inside the exterior front side airbag and configured to couple a lower end portion and the upper end portion of the exterior front side airbag when expanded and deployed.

9. The pedestrian protection airbag apparatus according to claim 8,
wherein the exterior front side airbag comprises
an upper bag constituting an upper portion of the exterior front side airbag, and
a lower bag constituting a lower portion of the exterior front side airbag, and
wherein an inner pressure of the upper bag is lower than an inner pressure of the lower bag.

10. The pedestrian protection airbag apparatus according to claim 1, wherein the exterior front side airbag comprises:
an upper bag constituting an upper portion of the exterior front side airbag; and
a lower bag constituting a lower portion of the exterior front side airbag.

11. The pedestrian protection airbag apparatus according to claim 1, wherein a lower side of the exterior front side airbag is in contact and substantially parallel with a road surface when expanded and deployed, and
wherein the exterior front side airbag is disposed lower than the exterior rear side airbag.

12. The pedestrian protection airbag apparatus according to claim 1, wherein a front bag door and a rear bag door are disposed in the side sill, and
wherein the front bag door is disposed lower than the rear bag door, and the exterior front side airbag is disposed lower than the exterior rear side airbag.

13. The vehicle comprising the pedestrian protection airbag apparatus according to claim 1.

14. A pedestrian protection airbag apparatus comprising:
an exterior front side airbag disposed in a front portion of a side sill of a vehicle, and configured to, upon being supplied with gas, be expanded and deployed along a side surface of the vehicle; and
an exterior rear side airbag disposed in a rear portion of the side sill of the vehicle, and configured to, upon being supplied with gas, be expanded and deployed along the side surface of the vehicle,
wherein an upper end portion of the exterior front side airbag is disposed lower than an upper end portion of the exterior rear side airbag,
wherein the exterior front side airbag comprises
an upper bag constituting an upper portion of the exterior front side airbag, and
a lower bag constituting a lower portion of the exterior front side airbag, and
wherein an inner pressure of the upper bag is lower than an inner pressure of the lower bag.

15. The vehicle comprising the pedestrian protection airbag apparatus according to claim 14.

16. An airbag apparatus comprising:
an exterior front side airbag disposed in a front portion of a side sill of a vehicle, and configured to, upon being supplied with gas, be expanded and deployed along a side surface of the vehicle; and
an exterior rear side airbag disposed in a rear portion of the side sill of the vehicle, and configured to, upon being supplied with gas, be expanded and deployed along the side surface of the vehicle,
wherein an upper end portion of the exterior front side airbag is disposed lower than an upper end portion of the exterior rear side airbag when expanded and deployed, and
the exterior rear side airbag is supported by a rear bag door from a lower side of the vehicle,
wherein the exterior front side airbag is supported from below at a level lower than a level of a support from below the exterior rear side airbag.

17. The airbag apparatus according to claim 16, wherein
a front bag door and the rear bag door are disposed in the side sill,
the front bag door is configured to be ruptured and opened outward in a vehicle width direction from a lower end portion of the side sill in a case where the exterior front side airbag is expanded and deployed; and
the rear bag door is configured to be ruptured and opened outward in the vehicle width direction from a lower end portion of the side sill in a case where the exterior rear side airbag is expanded and deployed,
the exterior rear side airbag is supported by the rear bag door from a lower side of the vehicle, and
the front bag door is disposed lower than the rear bag door, and the exterior front side airbag is disposed lower than the exterior rear side airbag.

18. The airbag apparatus according to claim 16, wherein the exterior front side airbag comprises:
an upper bag constituting an upper portion of the exterior front side airbag; and
a lower bag constituting a lower portion of the exterior front side airbag.

19. The airbag apparatus according to claim 16, wherein a lower side of the exterior front side airbag is in contact and substantially parallel with a road surface when expanded and deployed, and wherein the exterior front side airbag is disposed lower than the exterior rear side airbag.

20. The vehicle comprising the airbag apparatus according to claim 16.

* * * * *